United States Patent
Jain

(10) Patent No.: US 10,984,431 B1
(45) Date of Patent: Apr. 20, 2021

(54) DATA SUPPRESSION FOR DATA TRANSMISSION CONTROL

(71) Applicant: Amazon Technologies, Inc., Seattle, WA (US)

(72) Inventor: Sanjeev Jain, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 771 days.

(21) Appl. No.: 15/361,799

(22) Filed: Nov. 28, 2016

(51) Int. Cl.
*G06Q 30/02* (2012.01)
*G06Q 30/06* (2012.01)
*G06F 7/02* (2006.01)

(52) U.S. Cl.
CPC ......... *G06Q 30/0201* (2013.01); *G06F 7/026* (2013.01); *G06Q 30/0202* (2013.01); *G06Q 30/0603* (2013.01); *G06Q 30/0631* (2013.01); *G06F 2216/03* (2013.01); *G06Q 30/0605* (2013.01)

(58) Field of Classification Search
None
See application file for complete search history.

(56) References Cited

U.S. PATENT DOCUMENTS

| | | | | |
|---|---|---|---|---|
| 7,966,334 B1 * | 6/2011 | Bezos | ............ | G06Q 30/06 707/748 |
| 8,239,287 B1 | 8/2012 | Smith et al. | | |
| 8,285,602 B1 * | 10/2012 | Yi | ............ | G06Q 30/00 705/26.7 |
| 8,290,818 B1 * | 10/2012 | Levitan | ............ | G06Q 30/0631 705/26.7 |
| 8,301,623 B2 | 10/2012 | Chakrabarti et al. | | |
| 8,396,760 B1 | 3/2013 | Bradley et al. | | |
| 8,438,052 B1 * | 5/2013 | Chanda | ............ | G06Q 30/0282 705/7.11 |
| 8,447,747 B1 | 5/2013 | Yi et al. | | |
| 8,666,980 B1 | 3/2014 | Vora | | |
| 2001/0021914 A1 * | 9/2001 | Jacobi | ............ | G06Q 30/02 705/14.53 |
| 2005/0071251 A1 | 3/2005 | Linden et al. | | |
| 2007/0094067 A1 * | 4/2007 | Kumar | ............ | G06Q 10/04 705/26.2 |
| 2008/0040341 A1 * | 2/2008 | York | ............ | G06Q 30/02 707/999.005 |
| 2008/0243631 A1 * | 10/2008 | Kane | ............ | G06Q 30/02 705/14.5 |
| 2008/0243638 A1 * | 10/2008 | Chan | ............ | G06Q 30/02 705/14.51 |

(Continued)

OTHER PUBLICATIONS

Butler, "Device independence and the Web," 2002, IEEE Internet Computing, vol. 6, No. 5, pp. 81-86 (Year: 2002).*

(Continued)

*Primary Examiner* — Ivan R Goldberg
(74) *Attorney, Agent, or Firm* — Knobbe, Martens, Olson & Bear, LLP

(57) ABSTRACT

Features are described for improving data transmission by filtering weakly associated items in sequences of item selections. By identifying spurious relationships, data transmissions for weakly related items can be altered or suppressed. The weak relationship may be identified in existing item-to-item associations or for a set of items scheduled for transmission to a user device.

14 Claims, 7 Drawing Sheets

(56) References Cited

U.S. PATENT DOCUMENTS

| | | | | |
|---|---|---|---|---|
| 2009/0132459 A1* | 5/2009 | Hicks | ................ | G06N 5/02 |
| | | | | 706/52 |
| 2011/0238525 A1* | 9/2011 | Linden | ................ | G06Q 30/02 |
| | | | | 705/26.7 |
| 2014/0222506 A1* | 8/2014 | Frazer | ................ | G06Q 30/02 |
| | | | | 705/7.29 |

OTHER PUBLICATIONS

Chung, "Categorization for grouping associative items using data mining in item-based collaborative filtering," 2014, Multimedia tools and applications, vol. 71.2, pp. 889-904 (Year: 2014).*

Yap, "Effective Next-Items Recommendation via Personalized Sequential Pattern Mining," 2012, In International conference on database systems for advanced applications, Springer-Verlag Berlin Heidelberg, pp. 48-64 (Year: 2012).*

* cited by examiner

DATA SUPPRESSION FOR DATA TRANSMISSION CONTROL

BACKGROUND

A variety of data mining systems and methods are known for detecting associations among items stored or represented in a database. For example, in the context of an electronic catalog of items, data mining processes are frequently used to identify items that tend to be viewed, purchased, downloaded, or otherwise selected in combination by users. For instance, a first item may be related to a second item if a relatively large number of interaction events with the second item are detected for users interacting with the first item. Some interaction events may be more indicative of a relationship between items than others. Associations can be used to as a factor to control whether and when data is transmitted.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
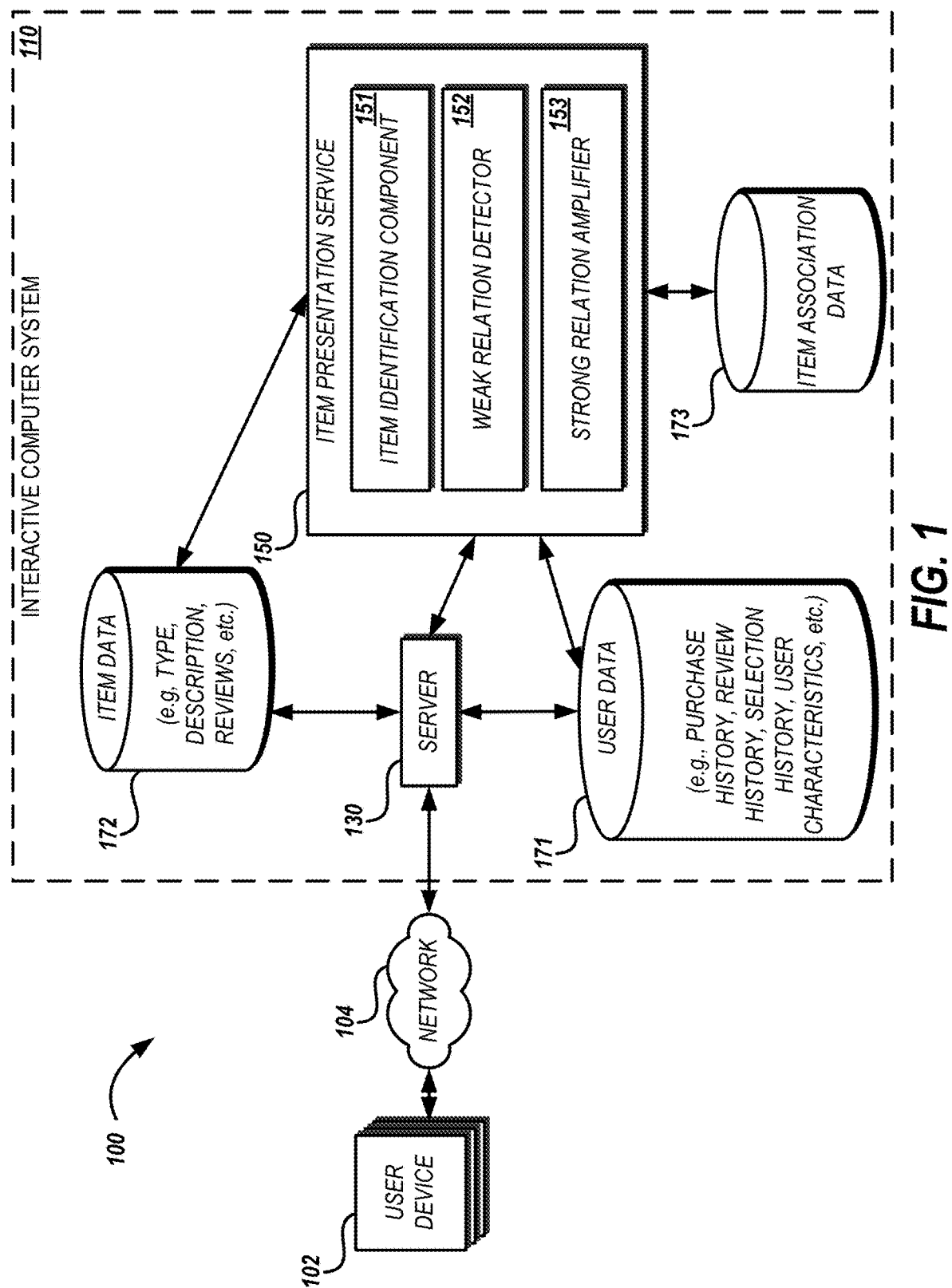
FIG. 1 is a diagram showing an example environment in which associations between items in a catalog system are identified and refined.

Determining which items to present can be guided using aggregated interaction information. As users interact with items such as those stored in an electronic item catalog, the interactions provide information about relationships between items. The item interactions may include an item purchased, rented, licensed, downloaded, installed, added to a wish list, saved, tagged, recommended, or subscribed to by a user.

The features described can improve which interactions are meaningful by analyzing temporal sequences of item interactions. For example, purchasing patterns could be considered as milestones in over a period of time a user interacts with the catalog system. Each purchase interaction marks a beginning of new but related interactions including, for example, views, clicks, etc. that could result in a subsequent purchase. The item interactions may indicate a change in item interaction patterns for a customer. For example, a smartphone purchase may result in series of subsequent viewing item interactions that could be related to smartphones or similar electronic items. These viewing interactions may, in turn, result in purchase item interactions.

Improving relevance of an interaction may be achieved by looking at item interactions around a specific item interaction (e.g., purchase interaction) and using these item interactions to identify relevant, subsequent, item interactions (e.g., purchase of another item).

Current systems may analyze actual item interactions (e.g., purchase events) while computing similarities between items using item-to-item co-relations. For example, Table 1 provides example sequences of item interactions for four users

TABLE 1

| User | Item Interaction Sequence |
|---|---|
| User 1 | A, B, C, D |
| User 2 | A, B |
| User 3 | A, B, C, D |
| User 4 | A, D |

A generalized co-relation for item A, is that most users who interact with item A, interact with item B. Some of the users who interact with item A may interact with item C and item D. To give this example more context, assume that item A is an smartphone, item B is a smartphone cable, item C is paper towels, and item D is a wireless speaker system.

In this context, paper towels may not have a logical relationship with smartphones that is as strong as the relationship with a smartphone cable. The causal link between such items may be described as spurious. The features described identify those items, such as paper towels, that may be linked to another product but may be related to each other due to weak co-purchasing patterns rather than a true co-relation. Suppressing presentation of these weak-link items can reduce the number of items considered such as when providing recommendations, and make the items presented or recommended more accurately align with previous item interactions.

For purposes of illustration, the systems and processes disclosed herein are described primarily in the context of an interactive computer system that provides users with access to, and recommendations from, a catalog of items on an e-commerce web site. As will be apparent, however, the disclosed systems and processes may also be used in other types of systems, and can be used to recommend other types of items, such as but not limited to web sites, news articles, blogs, podcasts, travel destinations, service providers, other users (e.g., as potential friends in a social network), events, discussion boards, photos and other images, online videos, tagged items, advertisements, software (including mobile applications), and user-generated lists of items. In addition, the disclosed systems and processes need not be implemented as part of, or in conjunction with, a web site.

The term "item," in addition to having its ordinary meaning, is used interchangeably herein to refer to an item itself (e.g., a particular product, service, bundle of products or services or any combination thereof) and to its description or representation in a computer system. As will be apparent from the context in which it is used, the term is also sometimes used herein to refer only to the item itself or only to its representation in the computer system.

FIG. 1 is a diagram showing an example environment in which associations between items in a catalog system are identified and refined. In the environment 100, users can access an interactive computer system 110 with user devices 102. The user devices 102 that access the interactive computer system 110 can include, for example, computing devices, such as desktop computers, laptop computers, tablets, personal digital assistants (PDAs), mobile phones, electronic book readers, other wireless handheld devices, set-top or other television boxes, media players, video game platforms, kiosks, glasses or other wearable devices, or any other device with a hardware processor. The user devices 102 access the interactive computer system 110 over a network 104, which can be a publicly accessible network of linked networks, possibly operated by various distinct parties, such as the Internet. In other embodiments, the network 104 may include a private network, personal area network (PAN), local area network (LAN), wide area network (WAN), cable network, satellite network, any other medium of computer data transfer, or some combination thereof.

The interactive computer system 110 can be implemented with one or more physical or virtual servers or other computing machines. Each of the components depicted in the interactive computer system 110 can include hardware and/or software for performing various features. In some implementations, the interactive computer system 110 may include specialized hardware for performing one or more processes described herein. For example, in some cases, the item presentation service 150 may be implemented using specialized hardware dedicated to identifying related items, or selecting and providing items for presentation based on identified associations between items. In one embodiment, the interactive computer system 110 is a network site that allows users to interact with a catalog of items.

In the depicted embodiment, the interactive computer system 110 includes several components that can be implemented in hardware and/or software. For instance, the interactive computer system 110 includes one or more servers 130 for receiving, processing, and responding to requests from user devices 102. The one or more servers 130 can include web servers, application servers, database servers, or other types of servers. The servers 130 can be geographically co-located or geographically dispersed. The one or more servers 130 may access or update information about items in an item database 172 that may store information about items including item details (e.g., type and description), item categories, item ratings, customer reviews, author pages, user-generated list pages, forum pages, blog pages, and the like. An item may include a product or service represented in a catalog system. The information stored for an item may include a time stamp to allow sequencing of item access or update information over time.

The one or more servers 130 may also access or update information about users in a user database 171 that may store various user features and activity information. User features may include user characteristic or demographic information, such as age, gender, ethnicity, religion, geographic location, occupation, income, spending levels, interests, hobbies, preferences, settings, customer group, combinations of the same, and/or the like. User activity information may include information about interactions with the catalog system and items stored therein such as a user's purchases, rentals, downloads, installations, selections, clicks, views, searches, ratings, page requests, additions or removals of items to wish lists and shopping carts, user interface events, tagging activity, subscriptions, combinations of the same, and/or similar interactions with an item, category of items, type of item, other users, or other entity of the interactive computer system 110. The information may include a time stamp to allow sequencing of user activity information over time.

The interactive computer system 110 may also include the item presentation service 150. The item presentation service 150 may be communicatively connected with the servers 130, the user database 171, the item database 172 and an item association database 173. The item presentation service 150 may include an item identification component 151, a weak relation detector 152, and a strong relation amplifier 153. In some implementations, the weak relation detector 152 may be omitted. In some implementations, the strong relation detector may be omitted 153.

The item association database 173 may include tables (relational or non-relational) and datasets that store information about item interactions and associations identified between items based on the interactions. The data maintained by the item association database 173 may be generated by the item presentation service 150 using historical user interactions such as purchases and ratings. The item presentation service 150 may employ various frequent itemset mining methods to identify associated items and a strength of the association between items. Thresholds, probabilities, or other criteria can be used to identify associations. For example, the number of users interacting with a first item followed by a second item may be used to identify an association. If the number of interactions detected exceeds the threshold, then the items may be associated. The item associations may also be created using any of the features (including probabilistic features) described in U.S. Pat. No. 8,239,287, filed Jan. 15, 2009, titled "System for Detecting Probabilistic Associations Between Items," the disclosure of which is hereby incorporated by reference in its entirety.

The item identification component 151 may access the item association data stored in the item association database 173 to identify items related to an item being viewed by a user. The related items may be items frequently purchased with the viewed item or items frequently purchased by customers who interact with the viewed item. The item identification component 151 may order the related items based on the strength of association between the viewed item and the related items. This can be useful to control the resources used by the interactive computer system 110 and the user device 102 presenting the items. For example, if the user device 102 is a smartphone, it may be desirable to limit the amount of data transmitted to the smartphone because of the display space or other resources needed to present the data at the smartphone. Conversely, if the user device 102 is a desktop computer, the resources typically available to the desktop computer are more abundant than a smartphone. In such instances, it may be desirable to transmit more data for more items to the user device 102. Using the strength of associations, the identified related items can be ranked according to association strength with the viewed item. The ranking can then be used to determine which related items (if any) are transmitted for presentation.

Figure 2A:
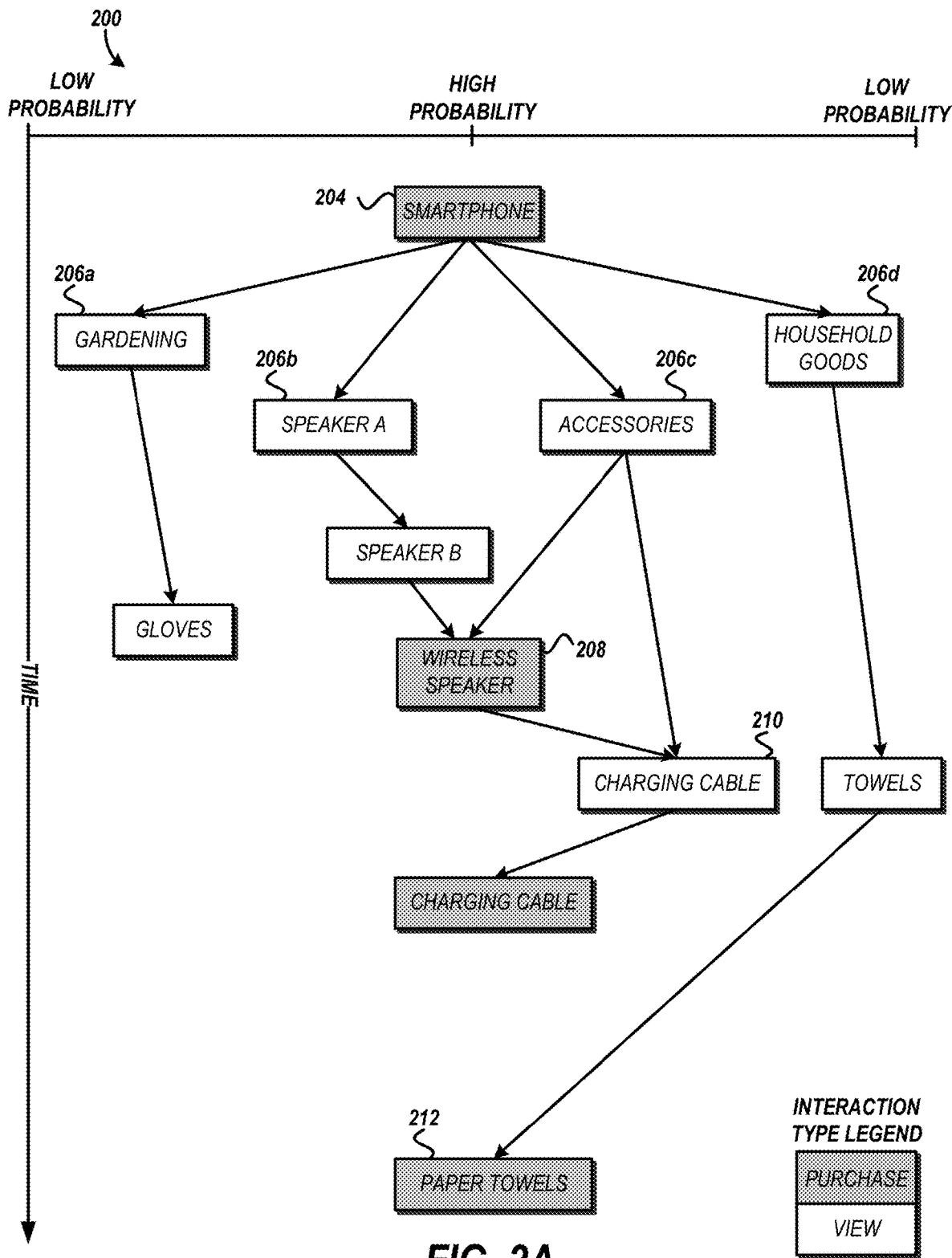
FIG. 2A is a diagram showing example item-to-item associations over time.

FIG. 2A is a diagram showing example item-to-item associations over time. The diagram 200 depicts a graph representation of the item-to-item associations, where the horizontal distance between nodes in the graph corresponds to the strength of association (with closer nodes indicating stronger associations). Vertical distance represents length of time between user interactions associated with certain items represented by the nodes. It will be appreciated that FIG. 2A shows a portion of the associations that may be stored in the item association database 173. In some implementations, the number of associations maintained may be over one million for a smaller catalog or far more—such as hundreds of millions or over a billion—for a larger catalog. FIG. 2A thus represents just a small portion of an item-to-item associations dataset. Although conceptually represented as a graph, the item-to-item associations dataset may be implemented using any of a variety of data structures (such as tables) partitioned over numerous database machines (e.g., in one or more data centers, including optionally cloud data centers).

Each node in the diagram 200 represents a user interaction with an item. The diagram 200 may be generated for interactions of a specific user or aggregated interactions for a set of users. The diagram 200 may be generated by first identifying a root node 204. The interactive computer system 110 may identify the root node 204 as an item or item type that needs refinement in item-to-item associations. For example, an item recently added to the catalog system or a popular item (e.g., a high quantity of user interactions over a period of time) may be more likely to benefit from refinement than an item added to the catalog system a long time ago or an unpopular item. In some implementations, the root node 204 may be identified in response to information received from a user. For example, when a user interacts with an item, it may be desirable, in response to detecting such interaction, to provide additional items to the user. In such instances, the item interacted with may be used as the root node 204.

In FIG. 2A, the root node 204 represents a purchase interaction for a smartphone. From this root node 204, the item interactions related to the smartphone are shown. For example, the item interaction data indicates that after buying a smartphone, some users viewed gardening items, some viewed speaker A, some viewed accessories for smartphones, and others viewed household goods. These interactions are represented by children nodes 206a, 206b, 206c, and 206d, respectively. The children nodes may represent a category of items (e.g., household goods) or a specific item (e.g., speaker A).

The path or edge between nodes may include an association score (not shown). The association score may indicate the strength of the relationship between the nodes. As shown in FIG. 2A, nodes that are horizontally distant from the root node are less related to the root node than those horizontally proximate to the root node. Thus, the distance between nodes conceptually represents lower association scores between nodes. A data structure implementation of the graph may include, for example, entries of "smartphone" and "speaker A" with another entry for the association score (e.g., in one row or record of a table).

Using the item-to-item associations shown in FIG. 2A, a smartphone purchase is highly likely to be related to subsequent interactions with speakers and accessories, but may be loosely related to interactions with gardening or household goods. Viewing interactions could result in subsequent viewing interactions of other related viewing interactions that could, ultimately, result in related purchasing interactions. In FIG. 2A, this is shown as the view and ultimate purchases of a wireless speaker (e.g., node 208) and a charging cable (e.g., node 210).

Gardening products or household goods views, which are weakly related to the smartphone purchase, may result in subsequent relevant views and ultimately a purchase event of paper towels. But, a highly unlikely household products view (e.g., node 206c) resulted in paper towel purchase (e.g., node 212) for at least some users. Accordingly, the relationship between smartphones and paper towels may be referred to as a weak association. That is, simply because a similar group of users purchased both paper towels and smartphones, the causal relationship between paper towels and smartphones may be spurious via loosely related intermediate item interactions.

Returning to FIG. 1, the weak relation detector 152 may implement additional item-to-item association processing to identify weak associations between items. For example, weak relation detector 152 may identify that paper towels are weakly associated with smartphones and modify the association data stored in the item association database 173. In some implementations, the weak relation detector 152 may remove weak item-to-item associations from the item-to-item associations dataset. In other embodiments, the weak relation detector 152 filters out (e.g., removes or attenuates the scores of) candidate recommendation items selected by the item identification component 151 prior to transmission to the user device 102. As discussed, the resources to transmit, receive, and present items may be limited and it may be desirable to conserve these resources for those items that are truly related. Absent a weak relationship detector, paper towels may be presented to a user viewing smartphones. Using a weak relationship detector, the strength of the association between paper towels and smartphones may be assessed and used to suppress presentation of paper towels with smartphones to a user. In some implementations, the identification of a weak item-to-item association can cause selection of an alternative item to present in place of paper towels. In this way, the items presented to a user are those which have a significant relationship to the viewed item.

Figure 2B:
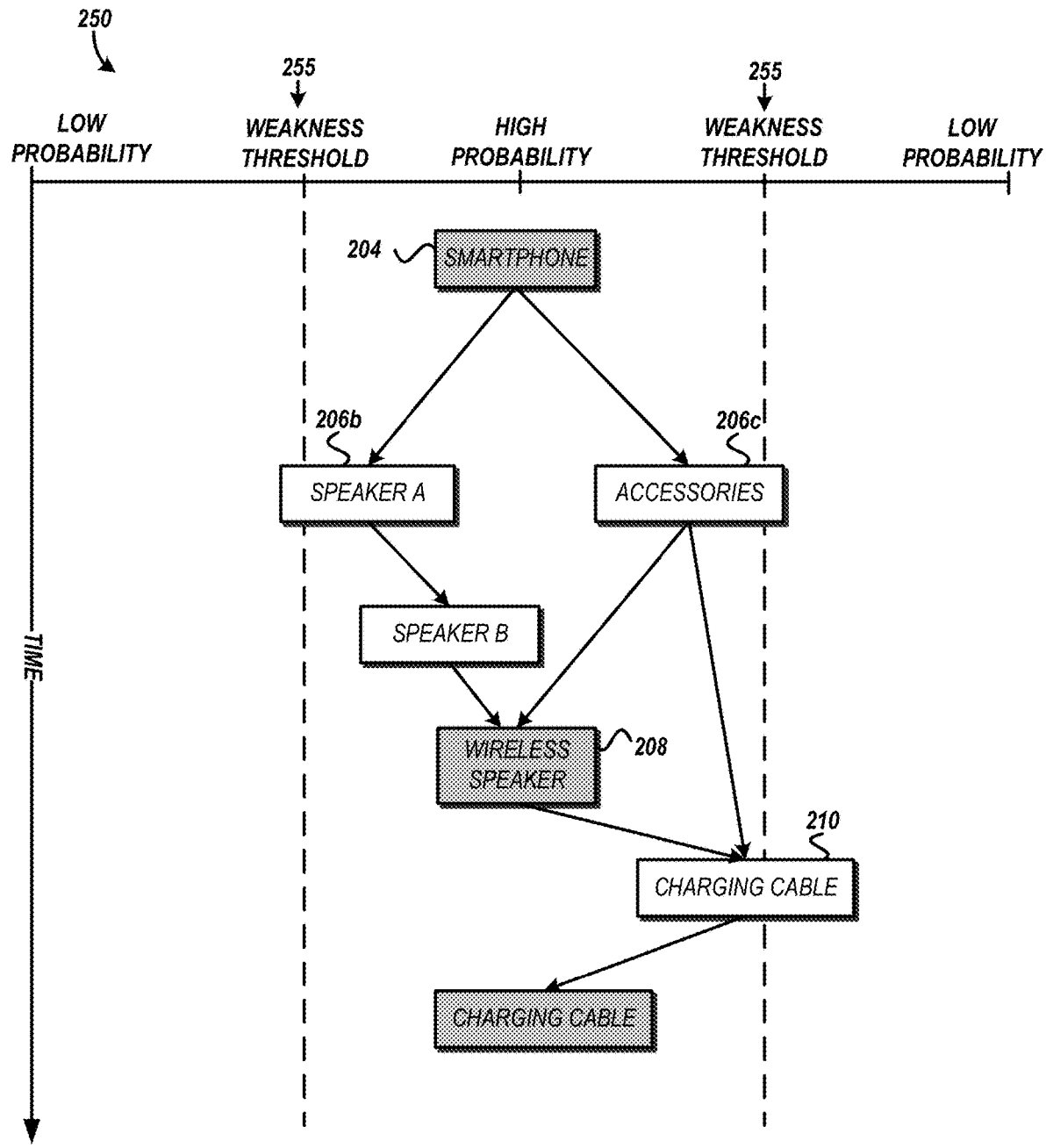
FIG. 2B is a diagram showing an example refinement of the item-to-item associations of FIG. 2A to remove weak associations.
Figure 2B:
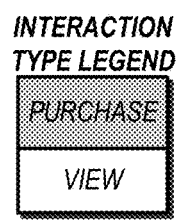

FIG. 2B is a diagram showing an example refinement of the item-to-item associations of FIG. 2A to remove weak associations. The diagram 250 is a graphic representation that includes fewer nodes than the diagram 200 shown in FIG. 2A. The weak relation detector 152 may identify those weak associations and, as shown in FIG. 2B, remove these nodes from the graph by removing the item-to-item association from the item association database 173. In some implementations, the weak relation detector 152 may modify (e.g., attenuate) the association score between items to more accurately account for weak relations. Or the weak relation detector 152 could delete a weak association entry in the item-to-item dataset.

A weak association may be detected using a weakness threshold 255. If an item-to-item association indicates an association having a strength less than the weakness threshold 255, the association can be identified as a weak association. As shown in FIG. 2B, the association between the root node 204 and child nodes 206a and 206d were below the weakness threshold 255. Thus, the child nodes 206a and 206d are absent in the diagram 250. In removing the child nodes, all subsequent children of the removed nodes were also removed because there was no other path to these subsequent children via items having associations above the weakness threshold 255. Had there been a path, for example, between child node 206b and paper towels node 212, the paper towels node 212 may have been retained in the diagram 250 because the bounds of the path would fall within the weakness threshold 255.

Significantly, in some embodiments, the result of deleting or attenuating weak associations between two items A and B can impact a chain of associations A→B→C. The item-to-item associations data set may include an association between items A and B (represented herein as A→B), as well as an association between items B→C. Transitively, the item identification component 151 may create a relation between items A and C (A→C). For example, referring to FIG. 2A, a smartphone (item A) is related to the household goods category (item B) which is in turn related to towels (item C), which is in turn related to paper towels (item D). The item-to-item association dataset, before application of the features described herein, may therefore include transitive associations between items A→C and items A→D. But the weak relation detector 152 can identify a weak association anywhere in this chain (A→B→C→D) and then, if one is found, modify (e.g., delete or attenuate) some or all transitive associations (e.g., delete A→C and A→D). Thus, for example, the weak relation detector 152 may delete associations between smartphones and paper towels. (The longer the chain of associations, A→. . . →N, the weaker the original transitive association between A→N may be, but nevertheless some such weak associations could result in poor recommendations until the weak relation detector 152 deletes or attenuates them further.)

The weakness threshold 255 may be a predetermined value. The value may be determined for specific item types. For example, a look up table may include thresholds for a given root item type. For a given item, the weak relation detector 152, may determine the type of the given item and retrieve the corresponding threshold for the type.

In some implementations, the weakness threshold 255 may be dynamically determined. For example, a predetermined number of interactions may be identified for a given item. The weakness threshold 255 may then be selected to afford the predetermined number of interactions such that when weak associations are removed, the predetermined number of nodes remain in the item-to-item associations. The predetermined number of nodes may be specified as a ratio, conceptually referred to herein as a signal-to-noise ratio. The noise portion of the signal-to-noise ratio may correspond to a number of nodes or node pairs to remove as compared to the signal—a number of nodes or node pairs to retain. In some implementations, the predetermined number (of the threshold) may be specified as a percentage of total nodes or node pairs. In some implementations, a resource level for the user device may be received and used to determine the number of interactions to analyze for weak relationships. For example, if the user device has resources available to display five items, it may be desirable to analyze only six or seven item interactions since the actual presentation may be limited to five items.

Time can also be considered by the weak relation detector 152 in identifying weak associations. For example, where the weak relation detector 152 modifies the item-to-item associations, the association score may be weighted based on a duration of time between the item interactions. The weight may inversely correspond to the duration of time such that interactions that occur further in time from the root node are given less weight since they did not occur as closely to the interaction modeled by the root node as other interactions. This can further suppress spuriously related items from being presented.

The type of interaction may be used to modify an item-to-item association. For example, certain a purchase interactions may indicate a stronger preference than a viewing interaction. Thus, a path that proceeds from the root node 204 through a sequence of views and then arrives at a purchase may indicate a lower relationship between the root node 204 and the item purchased than a path that processed directly from the root node 204 to the purchased item. Accordingly, an item-to-item association may be adjusted to account for the types of interaction(s) used to generate the association.

Returning to FIG. 1, the strong relation amplifier 153 may be included to perform item-to-item association processing to identify strong associations between items and, in some implementations, modify or attenuate the strong item-to-item associations to emphasize the strength of the association between items. For example, the strong relation amplifier 153 may identify that wireless speakers (e.g., node 208) are strongly associated with smartphones and modify the association data for a path from smartphones (e.g., root node 204) to wireless speakers (e.g., node 208) stored in the item association database 173. In some embodiments, the strong relation amplifier 153 adjusts the priority (e.g., increases or attenuates the scores) of candidate recommendation items selected by the item identification component 151 prior to transmission to the user device 102. As discussed, the resources to transmit, receive, and present items may be limited, and it may be desirable to prioritize use of these resources for those items that are truly related. Absent a strong relation amplifier, some or all relations may be treated as being equal. Using a strong relation amplifier, the strength of the association between items may be assessed and used to adjust the presentation of items to a user.

Figure 2C:
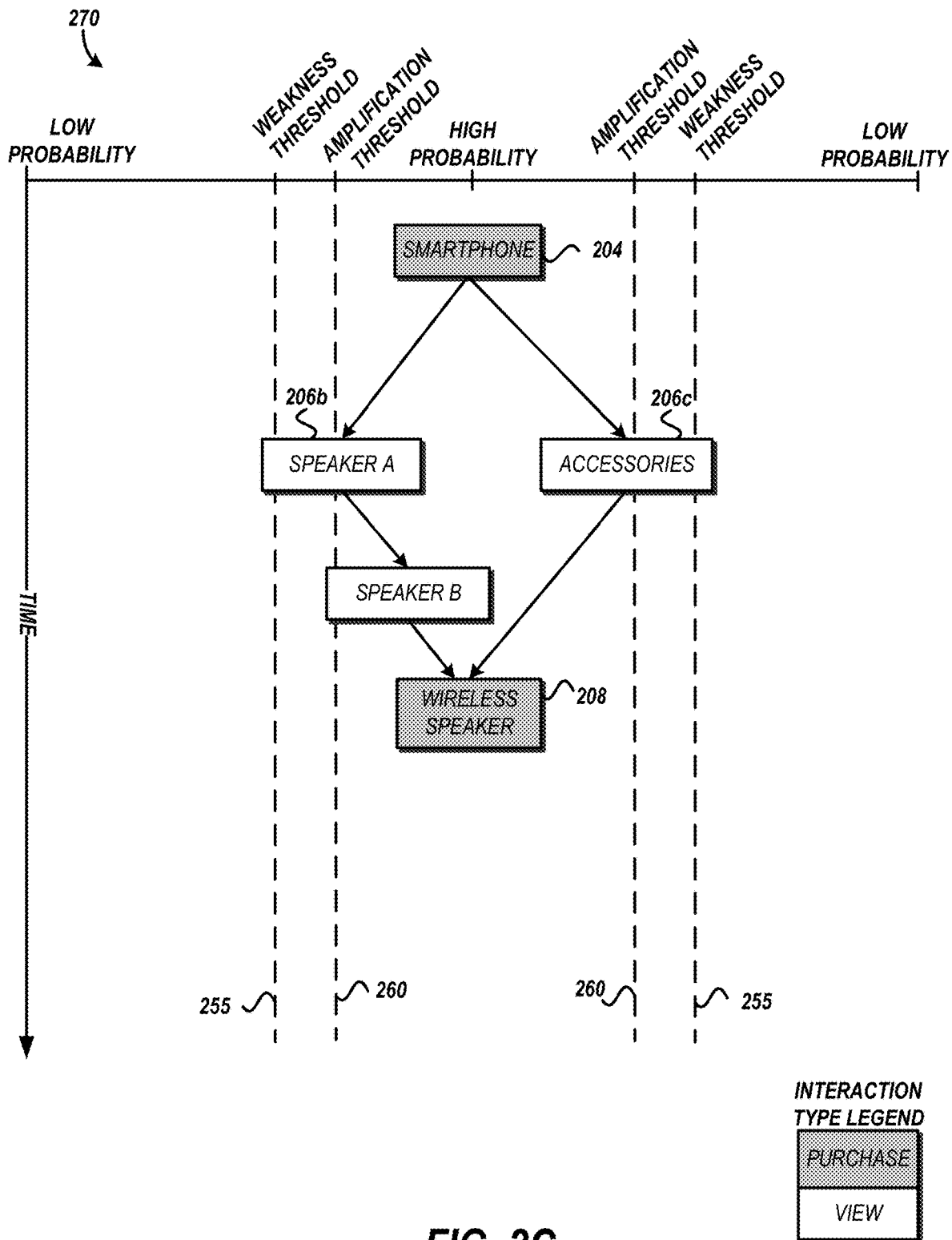
FIG. 2C is a diagram showing an example refinement of the item-to-item associations of FIG. 2B to amplify strong associations.

FIG. 2C is a diagram showing an example refinement of the item-to-item associations of FIG. 2B to amplify strong associations. The diagram 270 includes fewer nodes than the diagram 250 shown in FIG. 2B. The nodes shown in diagram 270 are those deemed to be strongly associated by the strong relation amplifier 153.

In some implementations the strong relation amplifier 153 may adjust the score for these strongly associated nodes and store the updated association scores in the item association database 173. In some implementations, the strong relation amplifier 153 may modify (e.g., increase or attenuate) the association score between items to more accurately account for strong relations.

A strong association may be detected using an amplification threshold 260. If an item-to-item association indicates an association having a strength above the amplification threshold 260, the association can be identified as a strong association. As shown in FIG. 2C, the association between the root node 204 and child node 210 of FIG. 2B was outside the amplification threshold 255. Thus, the path through the child node 210 in FIG. 2B is absent in the diagram 270 and will not be amplified in one embodiment. In removing the child nodes, all subsequent children of the removed nodes were also removed in this embodiment because there was no other path to these subsequent children via items having associations above the amplification threshold 255. As with the weakness threshold 255, the amplification threshold 260 may be a static value or dynamically determined as discussed above.

Returning to FIG. 1, the weak relation detector 152 and the strong relation amplifier 153 may independently operate in a batch mode or in a real-time mode. For example, in batch mode, the weak relation detector 152 may monitor the interactive computer system 110 for updates such as introduction of new items in the item data database 172, significant interactions with a given item/item type in the user data database 171, or updates to item-to-item associations in the item association database 173. The monitoring may include maintaining counts of items of interest and, when a current count exceeds the previous count by a threshold, initiating identification of strength of associations and refinement of the item-to-item associations. The monitoring may include comparing update date or time information for a record with a last refined date or time. If the duration between the update data or time information and the last refined date or time exceeds a threshold, the identification of association strengths and refinement may be initiated. In some implementations, the identification and refinement may be triggered according to a schedule whereby each item is associated with a scheduled processing time/date. Upon occurrence of the scheduled processing time/date, the weak relation detector 152 and/or strong relation amplifier 153 may initiate the identification and refinement of item-to-item association information for the item associated with the scheduled processing time/date.

Functionalities of the various components of the interactive computer system 110 can be distributed across multiple machines, networks, and other computing resources. The various components of the interactive computer system 110 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Figure 3:
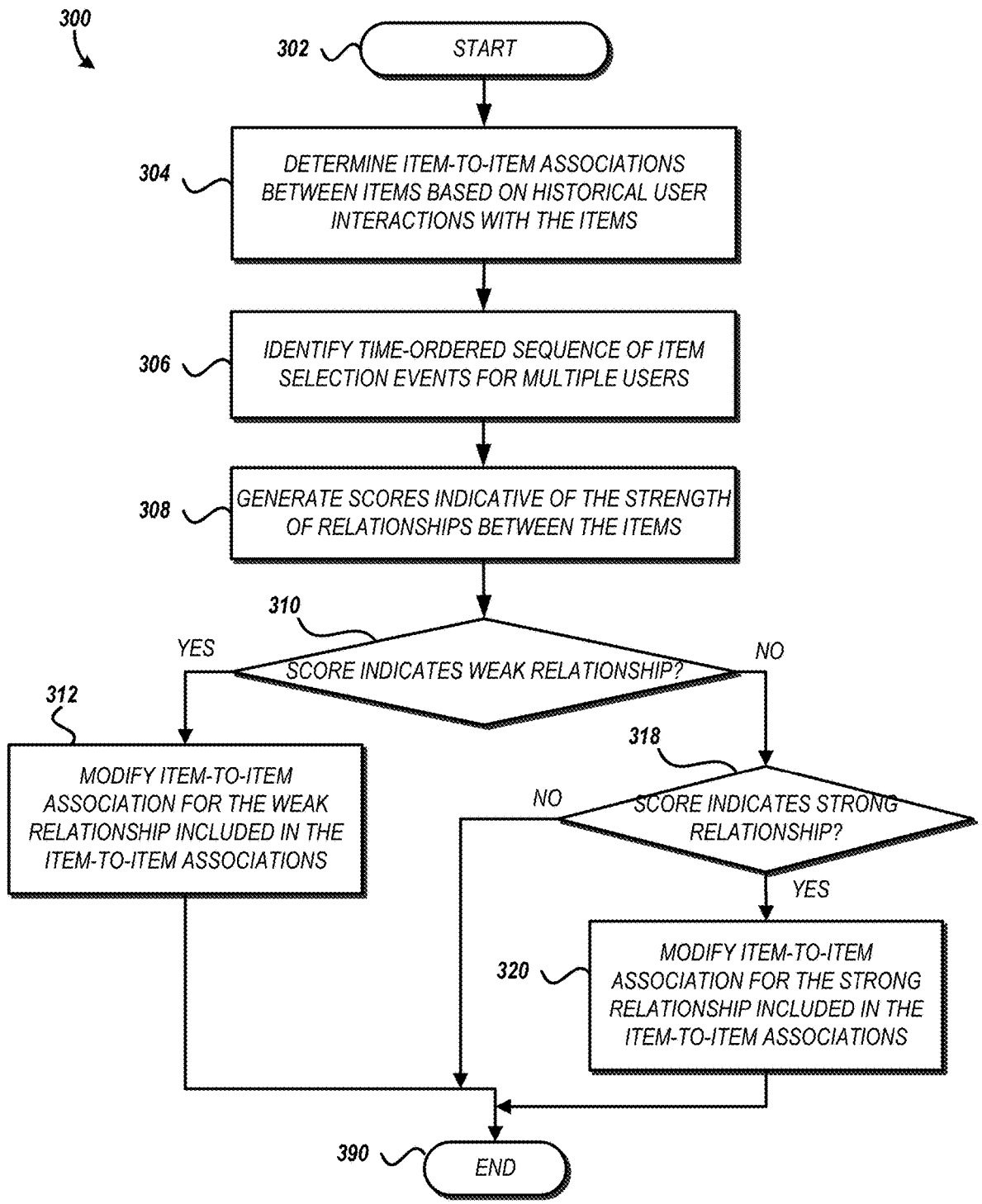
FIG. 3 is a flow diagram depicting an example method of identifying weak item-to-item associations and refining weak item-to-item associations.

FIG. 3 is a flow diagram depicting an example method of identifying strengths for item-to-item associations and refining item-to-item associations based on association strength. The method 300 may be performed in whole or in part by the item presentation service 150. The method 300 describes how weak associations are identified and the conditions under which the item-to-item associations are modified. The method 300 may be executed in a batch mode or real-time mode as discussed above.

The method 300 begins at block 302. At block 304, item-to-item associations between items may be determined by the item presentation service 150 or other system for detecting probabilistic associations between items. The determination of item-to-item associations may be based on item interactions stored by the interactive computing system 110.

At block 306, a time-ordered sequence of item selection events for multiple users may be identified within the item-to-item associations by the item identification component 151. The time-ordered sequence may be identified using an initial item of interest. The initial item may represent the root node in a graph such as node 204 shown in FIG. 2A. From this initial item of interest, related item selections may be retrieved. The related item selections may be retrieved for a period of time (e.g., those occurring within a number of days from the initial item interaction). A number of related item selections may be specified to control the amount of data processed. The number may be static or dynamically generated such as based on resources available to the computing system. The number of items retrieved may be bounded by a target item such that interactions between the item associated with the root node (e.g., purchase of a smartphone) and the target interaction (e.g., purchase of paper towels) are analyzed. This can be useful to provide accurate item-to-item relationships for items. The target item may be a co-related item that is analyzed for strength of relationship with the initial item, such as paper towels.

Using the time-ordered sequence of events, scores indicative of the strength of relationships between the items may be generated at block 308 by the weak relation detector 152 and/or strong relation amplifier 153. The generation of scores may include creating or modifying item-to-item association scores based on time between user interactions, number of user interactions, and so on. The score may be based on a length of a node path from the root item to another item. The length may be specified in terms of number of nodes (e.g., hops), horizontal distance of the path (e.g., cumulative probabilities), vertical distance of the path (e.g., temporal co-occurrence), type of interaction, number of users or unique users interacting, or a combination of one or more of these factors. The score may be based on a user's customer group or profile (e.g., preferred subscription customer versus new customer). The group or profile information may be stored in the user database 171 and retrieved using an identifier for the user associated with an item interaction. The score may be based on the type of interaction (e.g., click, select, view, purchase, etc.) such that different weights are given to different interactions. For example, a purchase may be an interaction indicating stronger preference for an item than a browsing interaction.

At block 310, a determination is made by the weak relation detector 152 as to whether a given score for item pairs included in the time-ordered sequence indicates a weak relationship. The determination may include comparing the generated score for a node pair to a threshold. The threshold, as discussed above, may be static or dynamically generated.

If the determination at block 310 is affirmative, the method 300 may proceed to block 312. At block 312, the item-to-item association for the weak relationship included in the item-to-item associations may be modified such as by the weak relation detector 152. Modification may include updating the association score for the item pair. For example, the association score between the root node 204 and the child node 206*d* may be updated. The updated score may be adjusted to decrease the relevance of a first item with reference to a second item. The modification may include removing an association between items identified as being weakly associated. The method 300 may end at block 390. In some implementations, it may be desirable to repeat the determination at block 310 for each node pair included in the time ordered sequence of item selection events.

Returning to block 310, if the determination at block 310 is negative, the method 300 continues to block 318. At block 318, a determination is made as to whether the score indicates a strong relationship. The determination at block 318 may include comparing the generated score for a node pair to an amplification threshold. The amplification threshold, as discussed above, may be static or dynamically generated. If the determination at block 318 is negative, the method 300 may end at block 390 as described above.

If the determination at block 318 is affirmative, at block 320, the item-to-item association for the strong relationship included in the item-to-item associations may be modified such as by the strong relation amplifier 153. Modification may include updating the association score for the item pair. For example, the association score between the root node 204 and the child node 206*b* may be updated. The updated score may be adjusted to increase the relevance of a first item with reference to a second item. After modifying the association score in view of the strong relationship, the method 300 may end at block 390 as described above.

Returning to FIG. 1, the weak relation detector 152 and/or strong relation amplifier 153 may operate in a real-time mode to assess the relationship between a target item and items selected for presentation with the target item. For example, when a user purchases a clock, the item identification component 151 may identify a set of additional items to present based on the clock purchase. It may be desirable to screen these additional items to prioritize (e.g., suppress, expedite) presentation of items based on the strength of the association.

Figure 4:
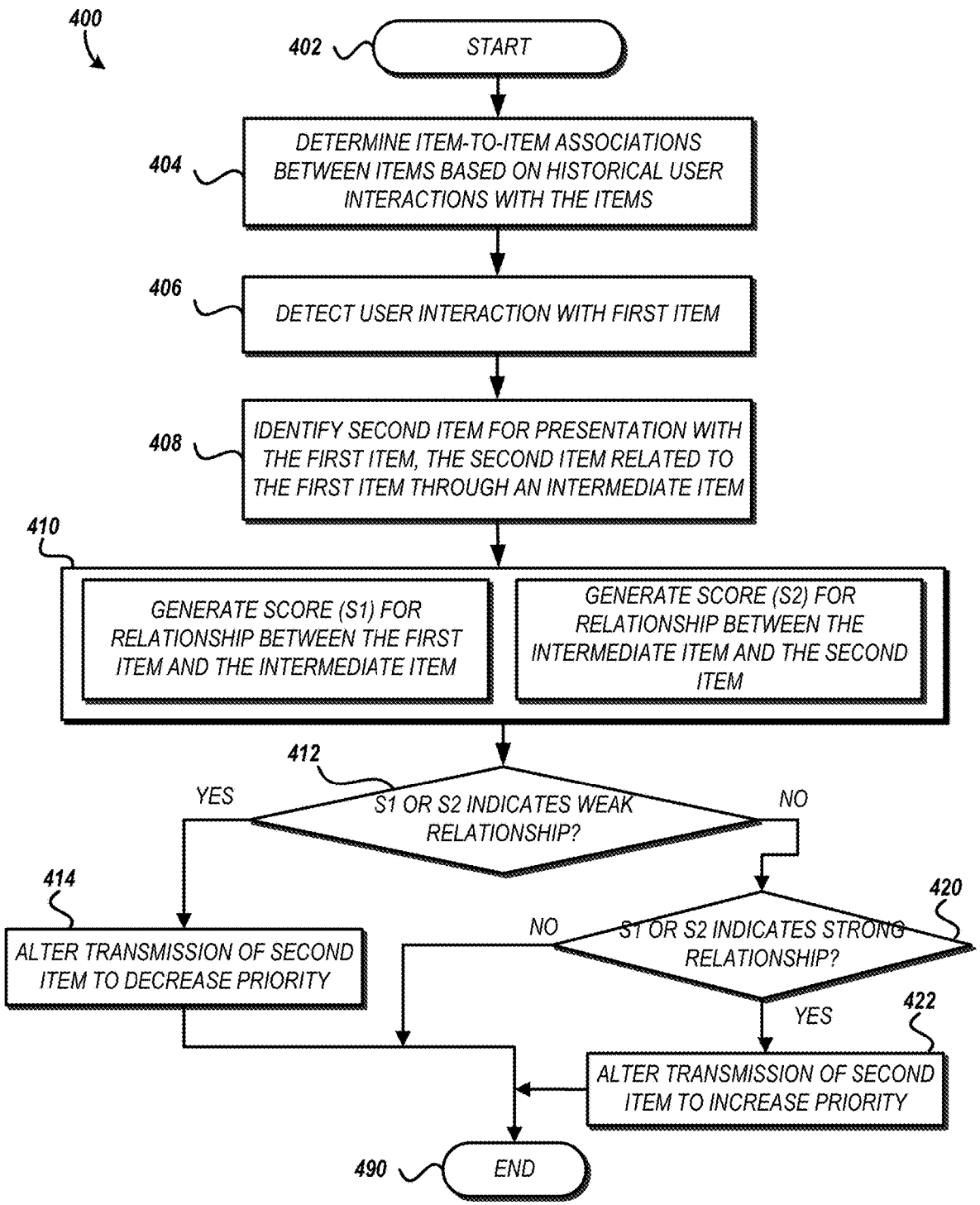
FIG. 4 is a flow diagram depicting an example method of adjusting items presented based on identification of weak item-to-item associations.

FIG. 4 is a flow diagram depicting an example method of adjusting items presented based on identification of weak or strong item-to-item associations. The method 400 may be performed in whole or in part by the item presentation service 150. The method 400 describes how a weak association between a viewed item and an additional item can be identified to suppress presentation of the weakly associated additional item. The method 400 also describes how a strong association between a viewed item and an additional item can be identified to increase the priority of presentation for the strongly associated additional item.

The method 400 begins at block 402. At block 404, item-to-item associations between items may be determined by the item presentation service 150 or other system for detecting probabilistic associations between items. The determination of item-to-item associations may be based on item interactions stored by the interactive computing system 110.

At block 406 an interaction with a first item is detected via the server 130. The interaction may be a view, purchase, search, review, selection, click, or other user operation with the first item. The detection may be in response to a message received by the interactive computing system 110 from a user device of the user. The interaction may include an identifier of the user and/or the first item.

At block 408, a second item may be identified for presentation with the first item by the item identification component 151. The second item may be identified by item identification component 151 based on item-to-item associations between the first item (or information about the first item such as type, category, size, etc.) and the second item. Information about the user (e.g., demographics, prior interactions, customer groups, etc.) may be considered when identifying the second item to present. The score may be based on a user's customer group or profile (e.g., preferred subscription customer versus new customer). The group or profile information may be stored in the user database 171 and retrieved using an identifier for the user associated with an item interaction. The score may be based on interaction type such that different weights are given to different interactions. For example, a purchase may be an interaction indicating stronger preference for an item than a browsing interaction As discussed above, some item-to-item associations may be spurious due to interactions with commonly items (e.g., paper towels) being mingled with interactions with specific items (e.g., smartphones). As also discussed above, presenting an additional item may consume precious resources of the system and/or user device. Accordingly, it may be desirable to suppress transmission and/or presentation of the weakly associated items. When a direct association between two items is present in the item-to-item associations, the association score may be sufficient to identify weak relationships. The features described identify a more complex weak relationship that may exist due to one or more weak intermediate associations.

At block 410, two scores may be generated such as by the weak relation detector 152. A first score may be generated between the first item and an intermediate item. A second score may be generated between the intermediate item and the second item. Generating the score may be based on a length of a node path from the root item to another item. The length may be specified in terms of number of nodes (e.g., hops), horizontal distance of the path (e.g., cumulative probabilities), vertical distance of the path (e.g., temporal co-occurrence), type of interaction, number of users or unique users interacting, or a combination of one or more of these factors.

At block 412, a determination is made as to whether the first score or the second score indicates a weak relationship by the weak relation detector 152. The determination may include comparing a generated score to a threshold. The threshold, as discussed above, may be static or dynamically generated.

If the determination at block 412 is affirmative, the method 400 may proceed to block 414. At block 414, the method 400 may include the weak relation detector 152 causing an alteration in the transmission of the second item. The alteration decreases the presentation priority for the second item as compared to other items. Altering transmission may include suppressing transmission of the second item for presentation with the first item. Altering the transmission may include identifying an alternative item to present in place of the second item. The alternative item may be identified from the item identification component 151. In some implementations, the method 400 may evaluate a list of items selected for presentation with the first item. In such implementations, the method 400 may evaluate each item independently or rank the items based on the strength of association with the first item. The ranking may be included in a message transmitted to the user device. The user device may in turn, use the ranking to assess which items to present such as based on display area, available resources, etc. The items (or information describing the items) may be presented via a user interface. The method 400 may then end at block 490.

Returning to block 412, if the determination at block 412 is negative, the method 400 may proceed to block 420 to determine whether either score indicates a strong relationship. Block 420 may be performed by the strong relation amplifier 153. The determination at block 420 may include comparing a generated score to an amplification threshold. The amplification threshold, as discussed above, may be static or dynamically generated.

If the determination at block 420 is affirmative, at block 422, the strong relation amplifier 153 may cause an alteration in the transmission of the second item to increase presentation priority of the second item as compared to other items. Because the second item has a strong relationship to the first item in this embodiment, it may be desirable to prioritize presentation of the second item. This may include including a ranking for the second item indicative of higher relevance. The ranking may be used by the user device to determine which items to present and the order of presentation. The prioritization may include selecting a higher priority transmission channel for information related to the second item, or ordering a transmission queue to ensure higher priority items for a user are positioned in the queue for transmission ahead of lower priority items for the user. The alteration may include additional or other adjustments that increase the efficiency of the transmission, receipt, and rendering of information about the second item.

Figure 5:
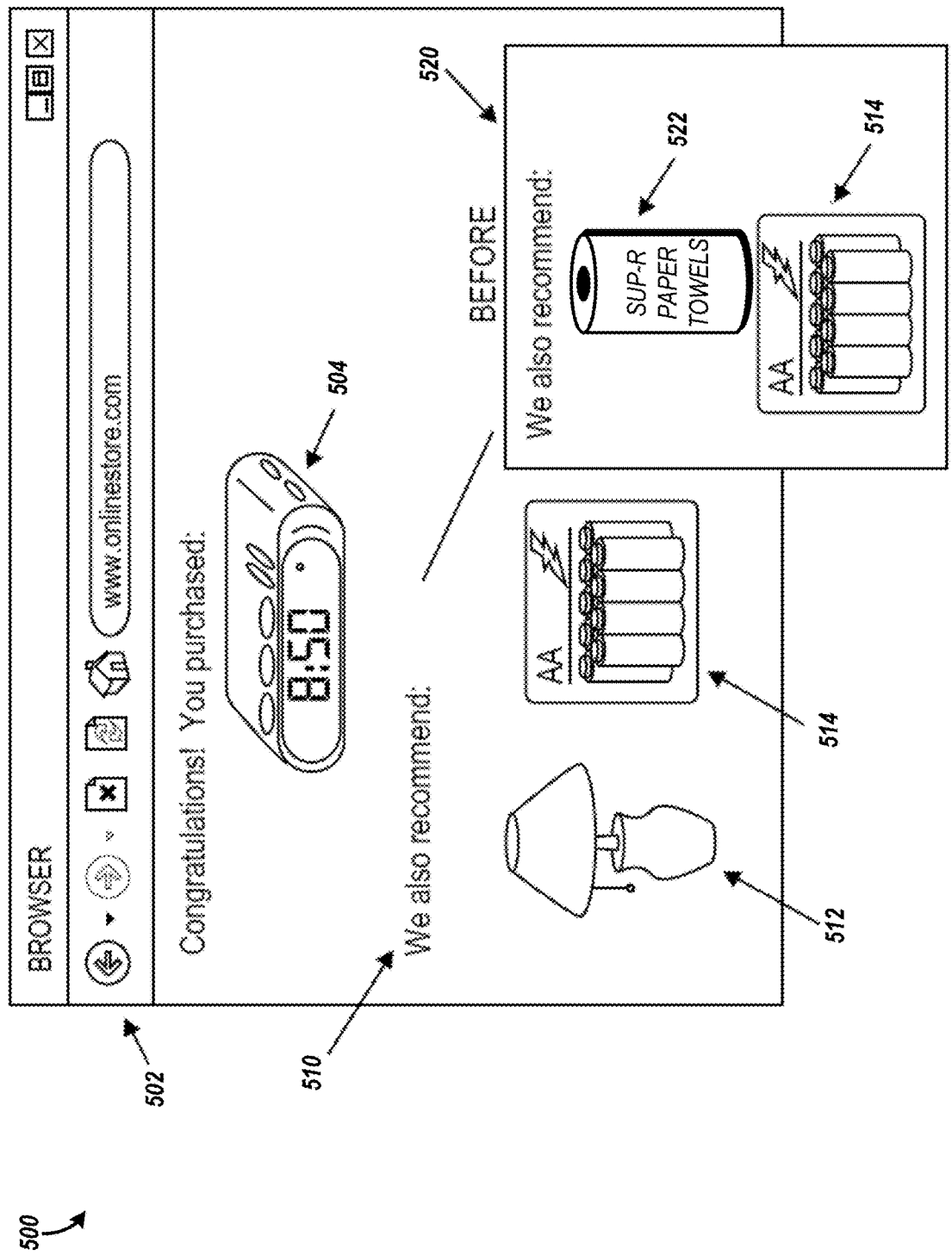
FIG. 5 is a diagram of an example user interface for presenting related items.

FIG. 5 is a diagram of an example user interface for presenting related items. In the depicted embodiment, the user interface 500 is show in the format of a web page. Items need not be provided, however, in the form of a web page and may, for example, be provided by another specialized application, such as a mobile item presentation application, an email application, or the like.

In FIG. 5, a user may access a web-based item catalog using a browser 501. In the example of FIG. 5, the user interacts with an alarm clock which represents a purchased item 504. The web site displays below the purchased item 504 a related item area 510, which contains items for presentation to the user based on the purchased item 504. Area 520 illustrates what the related item area 510 might look like without weak association detection. Although the user has already decided which alarm clock to purchase and has completed that purchase, the items initially identified for presentation in area 520 include batteries 514 and paper towels 522. As discussed above, the link between the purchased item 504 may be spurious, such as between an alarm clock and paper towels.

When weak relation detection is included, the item presentation service 150 may not rely solely on the item-to-item associations. Thus, the related item area 510 may not include a weakly related item, and the user may find, following her purchase of alarm clock 502, the items 512, 514 more appropriate.

The order in which the items in the related item area 510 are presented may be adjusted based on the strength identified by a strong relation amplifier 153. In cases where a recommended item is strongly related to the purchased item 504, the strongly related item may be presented more prominently than other items.

An example algorithm for presenting the item on the user interface 500 may include identifying users having a first interaction with an item (e.g., purchase alarm clock) and a second interaction with another item (e.g., batteries) in respective user's transaction histories, the second interaction occurring after the first interaction. A network of nodes forming one or more paths from the first interaction to the second interaction may be generated. The network of nodes may be visualized like the diagram 200 shown in FIG. 2A. Each node may represent an intermediate item interaction included in at least one user's transaction history. A probability may be assigned to each path between node pairs included in the network of nodes, the probability indicating a likelihood that an initial interaction represented by a first node in a node pair corresponds, with respect to the first interaction with the item, to a subsequent interaction represented by a second node in the node pair. Having generating an initial item-to-item association graph, children nodes may be removed from the network of nodes, the children nodes removed being associated with a path in the network of nodes having a probability below a threshold. At this point, the item-to-item associations will be pruned of weak associations. Then, an occurrence of the first interaction for a target user is detected. This interaction may be purchase of an alarm clock. The system may determine that a path exists in the network of nodes from the first interaction to the second interaction (e.g., purchase of batteries). Because a path exists between the alarm clock and purchase of batteries, it may be desirable to cause presentation of an item (e.g., batteries) associated with the second interaction on a device associated with the target user. The existing path indicates that there is a reasonable relationship between purchasing an alarm clock and batteries.

Terminology

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a user device or other hardware included in a catalog system. The user device or other hardware included in an catalog system may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. Devices used to implement the catalog system are specially designed to perform the batch or real-time weak association detection features described herein. One or more of the devices included in the catalog system may include electrical circuitry configured to process specific computer-executable to perform one or more of the features described herein. In embodiments where a device includes a FPGA or similar programmable elements, the catalog system (or a device included therein) may provide one or more of the features described processing without processing computer-executable instructions but instead by configuring the FPGA or similar programmable element to perform the recited features. Although described herein primarily with respect to digital technology, aspects of the catalog system may also include primarily analog components. For example, some or all of the real-time or batch weak association detection features described herein may be implemented in analog circuitry or mixed analog and digital circuitry.

The elements of a method, process, routine, or algorithm described in connection with the embodiments disclosed herein can be embodied directly in catalog system hardware, in a software module executed by one or more devices included in the catalog system, or in a combination of the two. A software module can reside in RAM memory, flash memory, ROM memory, EPROM memory, EEPROM memory, registers, hard disk, a removable disk, a CD-ROM, or similar form of a non-transitory computer-readable storage medium. An illustrative storage medium can be coupled to the catalog system such that the catalog system (or a device included therein) can read information from, and write information to, the storage medium. In the alternative, the storage medium can be integral to the catalog system or device having a need therefor.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for using programmatic data mining to suppress presentation of weakly associated items, the system comprising:
- a data store comprising specific computer-executable instructions; and
- a hardware processor in communication with the data store, the hardware processor configured to execute the computer-executable instructions to at least:
  - determine item-to-item associations between items based on an automated analysis of stored data representing user interactions with the items in an electronic catalog, wherein the user interactions refer to past user selections of the items in one or more electronic catalog user interfaces;
  - based on data received from a user device over a network, detect an occurrence of a user interaction with a first item included in an electronic catalog user interface presented by the user device;
  - identify at least a second item selected for presentation in the electronic catalog user interface as a recommendation related to the first item, wherein the second item and at least one other recommended item have been selected for presentation as recommendations but not yet transmitted to the user device for presentation, the second item having an item-to-item association with a third item, wherein the item-to-item associations include a first item-to-item association between the first item and the third item, and wherein the item-to-item associations further include a second item-to-item association between the second item and the third item;
  - prior to transmitting item recommendations to the user device:
    - identify scores indicative of strength of relationships between the first item and the third item and between the third item and the second item, wherein the identification of a score for two item selections is based on a number of items separating the two item selections in a time-ordered sequence of user selections which includes the two item selections;
    - determine that at least one of a first score between the first item and the third item or a second score between the second item and the third item is below a threshold, wherein the threshold indicates a weak relationship between items; and
    - determine, based at least in part on the weak relationship between the items, to suppress transmission and presentation of the second item selected for presentation, such that an amount of data to be transmitted to the user device in association with recommendation display is decreased; and
    - determine a type of user device and a respective resource level of the user device for rendering the electronic catalog user interface, wherein the resource level causes removal of a number of recommendation items for the determined type of user device;
  - transmit to the user device, over the network, responsive content for display in the electronic catalog user interface in response to the user interaction with the first item, wherein the responsive content transmitted for display includes the at least one other recommended item, wherein the responsive content does not include the second item that was selected for presentation but is suppressed by the system prior to transmission to the user device.

2. The system of claim 1, wherein the hardware processor is further configured to execute the computer-executable instructions to at least:
- identify scores indicative of strength of relationships between the first item and an intermediate item and between the intermediate item and a fourth item, wherein the fourth item is a further candidate item for presentation;
- determine that at least one of a first score between the first item and the intermediate item or a second score between the intermediate item and the fourth item is above a second threshold, wherein the second threshold indicates a strong relationship between items; and
- prioritize transmission of the further candidate item in response to the occurrence of the user interaction with the first item.

3. The system of claim 1, wherein the identification of a score for two item selections comprises weighting the score based on a duration of time between the two item selections, wherein the weight inversely corresponds to the duration of time.

4. The system of claim 1, wherein the hardware processor is further configured to execute the computer-executable instructions to at least:
- generate the threshold using a quantity of item selections for consideration, wherein the threshold causes removal of a number of item selections to provide the quantity of item selections.

5. The system of claim 4, wherein the quantity is one of:
- (i) a ratio, wherein the ratio corresponds to a number of item selections to remove as compared to a number of item selections to retain; and
- (ii) a percentage of total item selections.

6. The system of claim 4, wherein the quantity is generated based on the resource level of the user device for rendering the electronic catalog user interface, wherein the resource level is directly proportional to the quantity.

7. The system of claim 1, wherein the identification of a score for two item selections is weighted based on associated types of item selections, wherein purchase of an item is associated with a first weight and wherein viewing of the item is associated with a second weight.

8. The system of claim 1, wherein the hardware processor is configured to identify whether a threshold number of items are to be suppressed from presentation based on weak relationships, and wherein the threshold number is based on the resource level for the user device, the resource level identifying, at least, a number of items the user device is configured to display.

9. The system of claim 1, wherein the second item is initially selected for presentation in the electronic catalog user interface based on associations between information about the first item and information about the second item, wherein the information comprises one or more of an item category or item type.

10. A computer-implemented method of programmatic data mining to suppress presentation of weakly associated items, the method comprising:
- under control of a first computing device executing specific computer-executable instructions,
  - accessing associations between items based on an automated analysis of stored data representing user interactions with the items, wherein the user interactions refer to past user selections of the items via one or more user interfaces;

based on data received from a user device over a network, detecting an occurrence of a user interaction with a first item included in a user interface presented by the user device;

identifying that at least a second item has been selected for presentation in the user interface as a recommendation related to the first item, wherein the second item and at least one other recommended item have been selected for presentation as recommendations but not yet transmitted to the user device for presentation;

prior to transmitting item recommendations to the user device:

identifying, in the associations between items, a sequence of item selection events performed by a plurality of users, the sequence including item selections of the first item followed by a third item, followed by the second item, wherein one or more additional items follow the first item and are prior to the second item;

generating a first score indicative of strength of relationship between the first item and the third item, wherein the first score is based, at least in part, on a number of items separating the first item and the third item in the identified sequence;

generating a second score indicative of strength of relationship between the third item and the second item, wherein the second score is based, at least in part, on a number of items separating the third item and the second item in the identified sequence;

comparing the first score with a threshold to confirm the first is indicative of a weak relationship between the first item and the third item;

comparing the second score with the threshold to confirm whether the second score is indicative of a weak relationship between the third item and the second item; and in response to the comparing indicating a weak relationship exists in the sequence of item selection events, determining to suppress transmission and presentation of the second item selected for presentation, such that an amount of data to be transmitted to the user device in association with recommendation display is decreased;

determining a type of user device and a respective resource level of the user device for rendering the user interface, wherein the resource level causes removal of a number of recommendation items for the determined type of user device; and transmitting to the user device, over the network, responsive content for display in the user interface in response to the user interaction with the first item, wherein the responsive content transmitted for display includes the at least one other recommended item, wherein the responsive content does not include the second item that was selected for presentation but is suppressed prior to transmission to the user device.

11. The computer-implemented method of claim 10 further comprising removing an association between the first item and the second item from the associations based on the comparing indicating a weak relationship exists.

12. The computer-implemented method of claim 10, wherein generating the first score comprises weighting the score based on a duration of time between a first item selection event for the first item and a second item selection event for the third item, wherein the weight inversely corresponds to the duration of time.

13. The computer-implemented method of claim 10, further comprising:

generating the threshold using a quantity of item selections for consideration, wherein the threshold causes removal of a number of item selections to provide the quantity of item selections.

14. The computer-implemented method of claim 10, further comprising:

identifying scores indicative of strength of relationships between the first item and an intermediate item and between the intermediate item and a fourth item, wherein the fourth item is a further candidate item for presentation;

determining that at least one of a first score between the first item and the intermediate item or a second score between the intermediate item and the fourth item is above a threshold, wherein the threshold indicates a strong relationship between items; and prioritizing transmission of the further candidate item in response to the occurrence of the user interaction with the first item.

* * * * *